United States Patent [19]

Van Lookeren Campagne

[11] 4,094,813

[45] June 13, 1978

[54] PROCESS AND APPARATUS FOR THE MANUFACTURE AND COOLING OF GASES CONTAINING HYDROGEN AND CARBON MONOXIDE

[75] Inventor: Nicolaas Van Lookeren Campagne, Rotterdam, Netherlands

[73] Assignee: Shell Oil Company, Houston, Tex.

[21] Appl. No.: 380,437

[22] Filed: Jul. 18, 1973

[30] Foreign Application Priority Data

Aug. 2, 1972 United Kingdom ............... 36028/72

[51] Int. Cl.$^2$ ........................... C07C 1/02; B01J 7/00
[52] U.S. Cl. ........................................ 252/373; 48/61
[58] Field of Search ........................................ 252/373

[56] References Cited

U.S. PATENT DOCUMENTS

| | | | |
|---|---|---|---|
| 3,446,747 | 5/1969 | Borgiorno | 252/373 |
| 3,687,646 | 8/1972 | Brent et al. | 252/373 |
| 3,694,373 | 9/1972 | Schlinger et al. | 252/373 |

*Primary Examiner*—Alan M. Siegel

[57] ABSTRACT

High operating temperature and pressure differentials in a helical tube waste heat boiler employed to cool hot, soot-containing synthesis gas produced by the partial combustion of carbonaceous fuels, are avoided by pre-cooling the hot synthesis gas from the partial combustion reactor by passing it over one or more cooling tubes which are externally insulated with a refractory material of a specified thickness, e.g., at least 10 millimeters, in a primary cooling zone, prior to introduction into the waste heat boiler. High pressure steam from the waste heat boiler can beneficially be employed as the coolant medium in the primary cooling zone thereby providing an economical source of superheated, high pressure steam.

7 Claims, 2 Drawing Figures

PROCESS AND APPARATUS FOR THE MANUFACTURE AND COOLING OF GASES CONTAINING HYDROGEN AND CARBON MONOXIDE

BACKGROUND OF THE INVENTION

The present invention relates to a process and an apparatus for the manufacture of gases containing hydrogen and carbon monoxide, i.e., synthesis gas, by the partial combustion of carbonaceous fuels, and for cooling of the hot gases thus obtained.

Efficient cooling of hot gases obtained in the partial combustion of carbonaceous fuels in a waste heat boiler generating high-pressure steam is difficult to achieve for a number of reasons.

It is not desirable to cool the gases in a conventional straight tube waste heat boiler in which the gases pass through straight tubes which are externally cooled with water, because the gases contain soot particles which deposit on the walls of the tubes and eventually block them. It is therefore preferable to cool the gases in a helical tube waste heat boiler in which the gases pass through helical tubes which are externally cooled by water, since soot build-up does not occur in the helical tubes. Such helical tube waste heat boilers are described, for example, in U.S. Pat. No. 2,967,515 to Hofstede et al and Canadian Pat. No. 634,687 to Hofstede et al.

In order to operate a helical tube waste heat boiler as efficiently as possible, it is desirable to generate very high pressure steam. Accordingly, a large pressure differential results between the water vapor outside the helical tubes and the gases inside the helical tubes. In addition, the temperature of the helical tubes is very hot as a consequence of contact with the extremely hot combustion gases. Under such severe conditions the helical tubes are liable to collapse because of weaknesses in the tubes caused by unroundness.

Unroundness of a tube signifies its deviation from perfect radial and axial symmetry. Such unroundness results in a helical tube during its manufacture by the winding of a straight tube and considerably reduces its mechanical strength. The possibility of tube collapse therefore limits the extent to which the pressure differential between the inside and outside of the helical tubes can be raised at high tube temperatures. Because of these limitations the advantages of very high steam generation cannot be realized in helical tube waste heat boilers unless tubes having a low degree of unroundness are employed which are difficult to produce and expensive, or unless special measures are taken to reduce the temperature and/or pressure in the boiler such as described in U.S. Pat. No. 3,712,371 to Ter Haar et al. This patent discloses a process for cooling a hot synthesis gas in a waste heat boiler containing a straight tube of critical length attached to a helical coil tube, both of which are in external contact with water within the waste heat boiler. The present invention concerns a process and apparatus wherein a conventional helical tube waste heat boiler is employed in conjunction with an external primary cooling zone of unique design as hereinafter described.

It is therefore an object of the present invention to provide a process for the manufacture of gases containing hydrogen and carbon monoxide in which cooling of the hot gases is carried out in a helical tube waste heat boiler operating at high pressure differentials in an economical, efficient and reliable manner. It is another object of the present invention to cool hot hydrogen and carbon monoxide containing gases in large scale helical tube waste heat boilers which would be prohibitively expensive to construct if it were necessary to employ large diameter helical tubes having a low degree of unroundness.

SUMMARY OF THE INVENTION

It has now been found that in a process for the manufacture of a hydrogen and carbon-monoxide containing gas mixture by the partial combustion of a carbonaceous fuel with an oxygen-containing gas whereby a hot, carbon monoxide and hydrogen-containing gas mixture is obtained which is cooled in a helical tube waste heat boiler, that high temperature and pressure differentials in the waste heat boiler can be avoided and the overall efficiency and safety of the process improved by cooling the hot gas mixture to a temperature below 1200° C by passing it over one or more cooling tubes which are externally insulated with a refractory material of at least 10 millimeters thickness in a primary cooling zone prior to introduction of the gases into the waste heat boiler. Further benefits are obtained if steam generated in the waste heat boiler is employed as the coolant in the primary cooling zone, in that this results in the generation of high pressure, superheated steam which serves as a convenient source of energy for use in turbines, etc.

DETAILED DESCRIPTION OF THE INVENTION

The temperature of gases leaving the reactor of a partial combustion process for the production of a hydrogen and carbon monoxide-containing gas mixture generally lies between about 1300° and about 1500° C. The pressure may vary from 1 to 300 atmospheres but typically lies between 10 and 250 atmospheres.

Immediate cooling of such hot gases in a helical tube waste heat boiler, the tubes of which operate at high pressure differentials, may result in failure of the tubes due to unroundness as earlier explained. Accordingly, in the present process the gases leaving the reactor are first cooled in a primary cooling zone to a temperature not exceeding 1200° C and then passed to a helical tube waste heat boiler for raising high pressure saturated steam. At gas temperatures not exceeding 1200° C, the risk of failure of the tubes in the waste heat boiler is substantially eliminated. Preferably, the temperature of the gases leaving the primary cooling zone lies between 900° and 1100° C in which case the risk of tube failure in a subsequent waste heat boiler is negligible because of the lower temperature.

An important advantage of reducing the temperature of the gases in the primary cooling zone to at most 1200° C is that the constraints upon scaling up the subsequent waste heat boiler owing to unroundness of the tubes and the risk of failure thereof at high pressure differentials are no longer severe. Accordingly, large scale waste heat boilers may be employed and the economic benefits of size realized.

In accordance with the invention, the cooling tubes in the primary cooling zone are insulated from the hot gases with a refractory material in order to protect them from overheating and possible failure. The thickness of refractory material which insulates the cooling tubes varies according to the refractory material used and the degree of insulation required, but preferably is at least 10 millimeters. The diameter of the cooling tubes preferably lies between 20 and 200 millimeters, and the diameter of the insulated tubes preferably lies between 40 and 400 millimeters.

In a particularly preferred embodiment of the present invention, the hot gases are cooled by passing them through gas channels formed by cooling tubes contained within parallel layers of refractory material. Preferably the cooling tubes are substantially straight and are positioned in the overall direction of gas flow although this is by no means essential. The cooling of the hot gases in this manner has the advantage that a low pressure drop results across the gas channels and that solid particles such as soot and ash pass through the channels which do not therefore become clogged. The passage of such particles may be temporarily retarded, however, by their adhering to the walls of the gas channels, but this serves to increase the efficiency of the process since the soot particles then have sufficient time to react further with steam and/or carbon dioxide in the hot gases to form carbon monoxide.

Preferably, at least one parallel layer of refractory material consists of two preformed refractory slabs fitted around the cooling tubes. Such a construction has the advantages that the two halves of the layer are pre-formed by a simple and economic molding technique to accurately fit the cooling tubes, and that assembly and dismantling of the layers is facilitated. Accordingly, if for example replacement of a refractory layer or a tube is required, the layer in question may be easily dismantled and replacement made. The cooling tubes may possess fins or other projections in order to allow greater adhesion and to increase heat transfer between the cooling tubes and the refractory material.

The width of the gas channels between the parallel layers of refractory material may vary over a wide range and depends, inter alia, on the width of the parallel refractory layers, the total surface area of refractory material required for cooling in a given primary cooling zone and the allowable pressure drop across the cooling zone. Preferably, however, it will lie between 40 and 200 millimeters. The width of the parallel refractory layers may also vary widely but will generally lie between 40 and 400 millimeters.

Any refractory material capable of withstanding the temperatures encountered in the primary cooling zone may be used to insulate the cooling tubes. Suitable refractory materials are well known in the art and include those prepared from alumina, zirconia, high alumina and silica raw materials. Such refractories are described in "Encyclopedia of Chemical Technology" by Kirk and Othmer, Second Edition, 1968, Vol. 17, pages 227–237. Particularly suitable refractory materials include alumina and fused mullite grain. This latter material has the general formula, $3 Al_2O_3.2 SiO_2$, and can be obtained by fusing silica sand and calcined alumina.

Any suitable cooling medium may be used in the primary cooling zone. However, it is particularly advantageous to use high pressure steam in which case the favorable economics of superheated high pressure steam generation are realized. The high pressure steam used as the coolant in the primary cooling zone may come from any source, but preferably, comes from the waste heat boiler. In this case an integrated system for the generation of superheated steam is made possible which is obviously advantageous.

Since the gases entering the waste heat boiler contain small amounts of solid particles in the form of soot and ash, a waste heat boiler which allows continued operation without eventual plugging due to build-up of such particles is desirable. Accordingly a waste heat boiler containing one or more helical tubes through which the hot gases from the primary cooling zone pass and which are externally cooled with water and water vapor is particularly suitable.

Any suitable carbonaceous fuel may be partially combusted according to the present invention. In general the fuel will be a liquid hydrocarbon fuel such as naphtha, heavy petroleum oils and residues, shale oil, tar sands oil, etc., although gaseous fuels or solid fuels such as coal, coke and soot (free carbon) can also be used. Solid fuel can be employed either in dry pulverized form or in the form of a slurry with a liquid which may be a fuel or water.

The invention also relates to an apparatus suitable for carrying out the process described hereinbefore. This apparatus comprises:

(a) a partial combustion reactor free of internals with an inlet for fuel, oxygen-containing gas and steam and an outlet for partially combusted gases, (b) a cooling vessel containing cooling tubes externally insulated with a refractory material of at least 10 millimeters in thickness, over which the partially-combusted gases are passed and partially cooled, and (c) a waste heat boiler containing a helical tube in external contact with water through which the partially-cooled gases are passed and further cooled with the concomitant generation of steam.

The thickness of the refractory material insulating the cooling tubes varies according to the refractory material used and the degree of insulation required, but normally is at least 10 millimeters as mentioned above. The diameter of the cooling tubes preferably lies between 20 and 200 millimeters and the diameter of the insulated tubes preferably lies between 40 and 400 millimeters.

In a preferred embodiment, the cooling tubes in the cooling vessel are contained within parallel layers of refractory material which is advantageous since the pressure drop across the parallel gas channels formed by the layers is low and solid particles do not clog the gas channels. From the point of view of ease of assembly and of dismantling the parallel layers of refractory material, it is preferable to construct each layer from two preformed refractory slabs fitted around the cooling tubes.

The width of the gas channels between the parallel layers of refractory material may vary over a wide range, but for the reasons already mentioned, it will preferably lie between 40 and 200 millimeters. The width of the parallel refractory layers preferably lies between 40 and 400 millimeters. Any suitable refractory material may be used to insulate the refractory tubes as previously mentioned, but alumina or a fused mullite grain is particularly preferred.

The gases entering the waste heat boiler contain small amounts of solid particles, e.g., soot and ash. In order to avoid clogging of the tubes of the waste heat boiler by the solid particles, it is preferable that a waste heat boiler containing one or more helical tubes be used.

A method in which the process and apparatus according to the present invention can be suitably used for the partial combustion of carbonaceous fuels and the cooling of the hot gases thus obtained is described below with reference to the accompanying drawings by way of example and without limitation. Accessories such as valves, pumps, control instruments and the like are not shown in the drawings.

Figure 1:
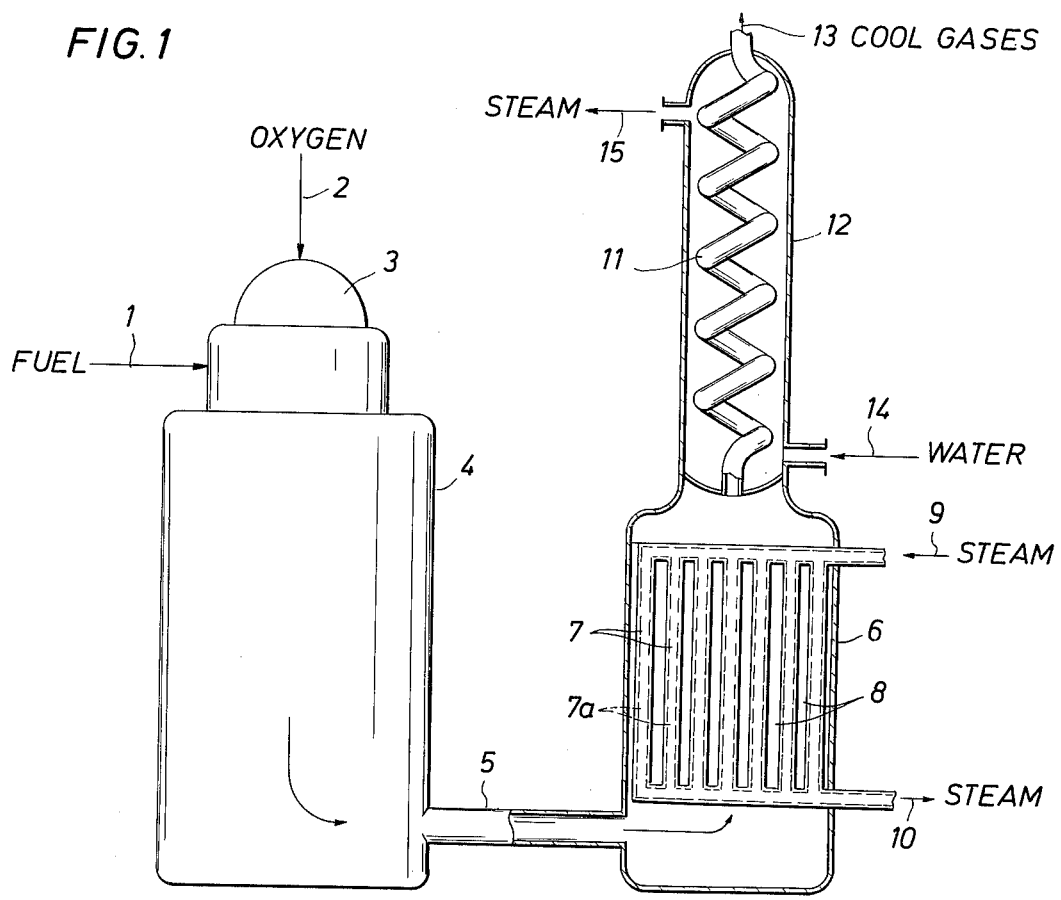
FIG. 1 is a diagrammatic representation of an apparatus for the partial combustion of carbonaceous fuels and for cooling of the hot gases thus obtained.

With regard to FIG. 1, carbonaceous fuel is introduced via line 1 and oxygen via line 2 into burner part 3 of partial combustion reactor 4 which is unpacked and free of internals. Steam, if required, may be introduced via both lines 1 and 2. The hot combustion gases pass through connecting piece 5 which connects the reactor to primary cooling vessel 6. The latter contains a number of parallel layers of refractory material 7 containing cooling tubes 7a. The hot gases pass in upflow through channels 8 formed by the parallel layers of refractory material. High pressure steam, which may be derived from waste heat boiler 12 as explained below, is introduced via line 9 into the cooling tubes contained within the parallel layer of refractory material and passes in downflow through the cooling tubes and out of the cooling vessel via line 10 as superheated, high pressure steam.

The gases leaving the cooling vessel pass through a helical tube 11 within waste heat boiler 12 and leave the waste heat boiler as cool gases via line 13. Water is introduced to the waste heat boiler via line 14, flows over the helical tube and passes out of the waste heat boiler via line 15 as high pressure, saturated steam. This may be used as the coolant in cooling vessel 6.

Figure 2:
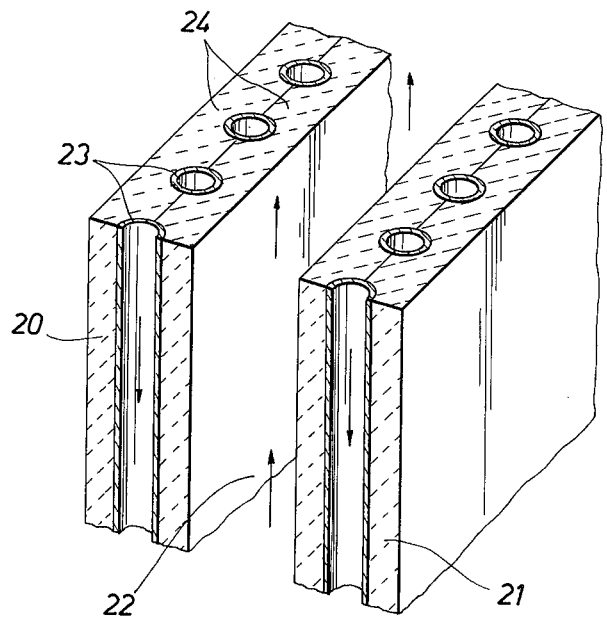
FIG. 2 is a perspective view, partially-cutaway, of two parallel refractory layers having a gas channel therebetween.

FIG. 2 depicts a section of two parallel layers of refractory material 20 and 21 between which is a parallel gas channel 22. The hot combustion gases pass in upflow through the gas channel and steam passes in downflow through cooling tubes 23 contained within the two parallel layers. Each parallel layer is constructed of two pre-formed refractory slabs 24 fitted around a number of cooling tubes.

In a practical embodiment of the invention, a cooling vessel with nine parallel alumina layers each layer containing twelve cooling tubes may be used. Each layer is constructed of two preformed alumina slabs fitted around the cooling tubes. The height of the parallel layers is 4.2 meters. The width of each layer is 180 millimeters and the width of the gas channels between the layers is 80 millimeters. The diameter of the tubes is 100 millimeters.

If 15.4 tons per hour of combustion gases are required to be cooled from a temperature of 1400° C to a temperature of 1025° C at a pressure of 60 atmospheres in the cooling zone, then 38.8 tons per hour of saturated steam at 310° C and 100 atmospheres should be supplied to the cooling zone. In such case the temperature of the superheated steam produced is 550° C.

The combustion gases leaving the cooling vessel at 1025° C are cool enough to pass to a helical tube waste heat boiler without fear of causing tube failure in the boiler.

What is claimed is:

1. In a process for the manufacture of a hydrogen and carbon monoxide-containing gas mixture by the partial combustion of a carbonaceous fuel with an oxygen-containing gas at a pressure of between 1 to 300 atmospheres and a temperature between about 1300° and about 1500° C whereby a hot, carbon monoxide and hydrogen-containing gas mixture is obtained which is cooled in a waste heat boiler containing a helical tube in external contact with water through which the hot gas mixture is flowed, the improvement which comprises cooling the hot gas mixture to a temperature not exceeding 1200° C by passing it over a cooling tube which is externally insulated with a refractory material of between 10 millimeters and 100 millimeters thickness in a primary cooling zone prior to introduction of the gas mixture into said waste heat boiler.

2. The process of claim 1 wherein the temperature of the gas mixture leaving the primary cooling zone lies between 900° and 1100° C.

3. The process of claim 2 wherein the hot gas mixture is cooled by passing it through gas channels formed by parallel layers of refractory material containing a plurality of cooling tubes within the primary cooling zone.

4. The process of claim 3 wherein the cooling tubes are substantially straight and are positioned in the overall direction of gas flow.

5. The process of claim 4 wherein the width of the gas channels between the parallel layers of refractory material lies between 40 millimeters and 200 millimeters.

6. The process of claim 5 wherein the cooling tubes are insulated with alumina or a fused mullite grain.

7. The process of claim 6 wherein the cooling medium introduced into the cooling tubes is high pressure, saturated steam which is superheated by heat exchange with the hot gas mixture in the primary cooling zone.

* * * * *